(12) United States Patent
Bernard

(10) Patent No.: US 11,358,316 B1
(45) Date of Patent: Jun. 14, 2022

(54) SUPER SMOOTH MANUFACTURING METHOD FOR SENSOR PROTECTIVE COVER

(71) Applicant: Edward Helmut Bernard, Maidstone (CA)

(72) Inventor: Edward Helmut Bernard, Maidstone (CA)

(*) Notice: Subject to any disclaimer, the term of this patent is extended or adjusted under 35 U.S.C. 154(b) by 0 days.

(21) Appl. No.: 17/478,136

(22) Filed: Sep. 17, 2021

Related U.S. Application Data

(60) Provisional application No. 63/084,716, filed on Sep. 29, 2020.

(51) Int. Cl.
*B29C 45/73* (2006.01)
*B29C 45/40* (2006.01)
*B29C 35/08* (2006.01)

(52) U.S. Cl.
CPC ...... *B29C 45/7312* (2013.01); *B29C 35/0805* (2013.01); *B29C 45/40* (2013.01); *B29C 2035/0822* (2013.01); *B29C 2045/7356* (2013.01)

(58) Field of Classification Search
CPC ........ B29C 2045/7393; B29C 45/7312; B29C 2045/7356; B29C 45/7306
See application file for complete search history.

(56) References Cited

U.S. PATENT DOCUMENTS

| 5,535,980 | A | * | 7/1996 | Baumgartner | .......... | B29C 33/56 |
| | | | | | | 106/38.22 |
| 2019/0111588 | A1 | * | 4/2019 | Kitchloo | ................ | G02B 1/043 |

* cited by examiner

*Primary Examiner* — Timothy Kennedy
*Assistant Examiner* — Alexander A Wang

(57) ABSTRACT

A thermal management system that provides metal mold surface temperature control using cyclic process thermodynamics to enhance plastic material flow and curing conditions making it possible to produce resin rich molded plastic surfaces without micro cracks or fissures to which contaminant particles can adhere or to which dirt can attach.

8 Claims, 16 Drawing Sheets

SUPER SMOOTH MANUFACTURING METHOD FOR SENSOR PROTECTIVE COVER

BACKGROUND OF THE INVENTION

The disclosed invention pertains to a complex thermal control system that requires thermal control features on the mold and/or with external thermal transfer apparatus, a rapid thermal transfer thermolator or similar fast heat exchanger, injection and/or compression molding process equipment integrated to optimize sequential timing of the system components. Rapid Heat Cool Molding, or RHCM, has been developed in Germany as early as 1957 to enhance sound reproduction with Stereophonic vinyl disc playback, where the RHCM process heated the vinyl disc mold to better accommodate the plastic flow and compression into the intricate grooves of the mold, using steam and water to achieve the RHCM. Rapid Heat and Cooling Molding, RHCM, technology was further advanced in Japan to produce a post-molded plastic surface finish referred to as Piano Black because the resin rich plastic appears to look like the shiny lacquer finish of a piano using RHCM concepts developed by Matsui for flat screen decorative trim without having to perform post molded painting (which increases recycling costs). Combining these existing processes, that have been developed for cosmetic or appearance goals, and modifying the RHCM purpose from merely producing a resin rich surface that appears to be painted, using RHCM to reduce cycle time and improve appearance, creating tooling conditions instead focused on eliminating surface imperfections at a microscopic level so that the geometric shapes of atmospheric dirt particles have no plastic surface micro cracks or fissures or other nooks and crannies to which to cling and build up, but to instead have such super smooth surfaces that sensor inhibiting build-up of either wet or dry airborne particles cannot stick, keeping the sensor performance unimpeded by the super smooth lens grade protective covers.

Typical ranges of surface roughness in injection molded plastic parts range from 0.025 to 6.3 micro meter dependent upon the mold surface quality and type of plastic. Typical dirt and debris particles found on roads and parking lots range in size from 0.8 to 100 micro meters, with 39% less than 6.3 micro meters in size as reported in an Ontario Ministry of the Environment report dated September 2012. There is therefore a considerable portion of the dirt and debris that is smaller than the surface roughness range of the plastic surfaces.

The super smooth plastic parts produced using this invention would also be useful in medical applications where liquids (such as blood) could lodge themselves into surface cracks creating potential infection problems.

SUMMARY OF THE INVENTION

Using a mold prepared with conformal cooling circuits configured to optimize not only rapid cooling of the mold cavity surface, but also rapid heating and cooling of the surfaces over which the plastic will be formed, these conformal cooling circuits will deliver heat energy to a (close) offset of the plastic part geometry to raise the mold surface temperature to near $T_g$, glass transition temperature at which the molded material changes state (from solid to liquid), to facilitate the material flow at (significantly) reduced pressure, lower shear, and more uniform material density, which reduces internal material stresses and associated distortion during the curing process, which begins as soon as the RHCM process switches from heating to cooling, once the mold cavity has been filled with material, at which point the molded plastic part can continue to cure during the cool period of the RHCM process, or can be ejected for post mold curing once a suitable stage of forming has been achieved.

By using a stack mold with a spinning center, where the mold is built with two parting lines and the center spinning section has two identical mold cores located 180 degrees from each other and both fit precisely to each of the two mold cavities, also located 180 degrees apart so that when the mold closes in a plastic injection machine, essentially two identical molds are stacked together with a spinning center core but the second non-injecting side of the mold has been manufactured with up to 10% crush, meaning the injection molded part thickness will have an interference fit to the second cavity after the mold has spun and the injection machine clamp force has been activated for a subsequent injection cycle, but the higher temperature second cavity will re-melt the injection molded plastic part surface, using the combination of clamp force and near Tg temperature second cavity surface to re-melt only the outer surface of the Sensor Cover parts, or by applying a combination of compression of the previously molded plastic part along with thermal conditioning with energy delivered by RHCM or in combination with an external alternative like infra-red applied just prior to the closing of the second partingline. When the mold parting lines open, the non-injection side will eject the now heat-treated plastic parts and the core will spin to position the newly injected parts at 180 degrees to be heat treated while the injection parting line fills another set of cavities for subsequent processing, and so on.

The plastic is injected into the mold which has been heated to reduce viscosity of the plastic while filling the mold cavities at reduced injection pressures, and then the mold is quickly cooled using conformal cooling lines offset from the part geometry. Once the plastic has cured adequately to open the parting line, but before complete cure has occurred, the mold will open and spin 180 degrees and compression fit a second cavity surface that has been heated to re-melt the plastic surfaces to further reduce or eliminate any surface imperfections that could affect optical precision and/or super-smoothness to prevent dirt from being able to stick.

The method for reheating the surface of the plastic part may be with Infrared energy emitted from end of arm tooling on the same robot that is used to demold the plastic parts, and supporting end of arm tooling to apply bursts of air (that have been treated chemically or thermally or both) to the part surfaces to further protect the residually warmer plastic material interior (of the molded plastic part) from instant humidification or delivering surface hardening methods to prevent scratching. Robotic demolding of sensor cover parts is the expected industry standard but clean room conditions could provide additional quality control benefits.

BRIEF DESCRIPTION OF THE DRAWINGS

These and other objects of the invention will become apparent from reading a detailed description taken in conjunction with the drawings, in which.

DETAILED DESCRIPTION

Figure 1:
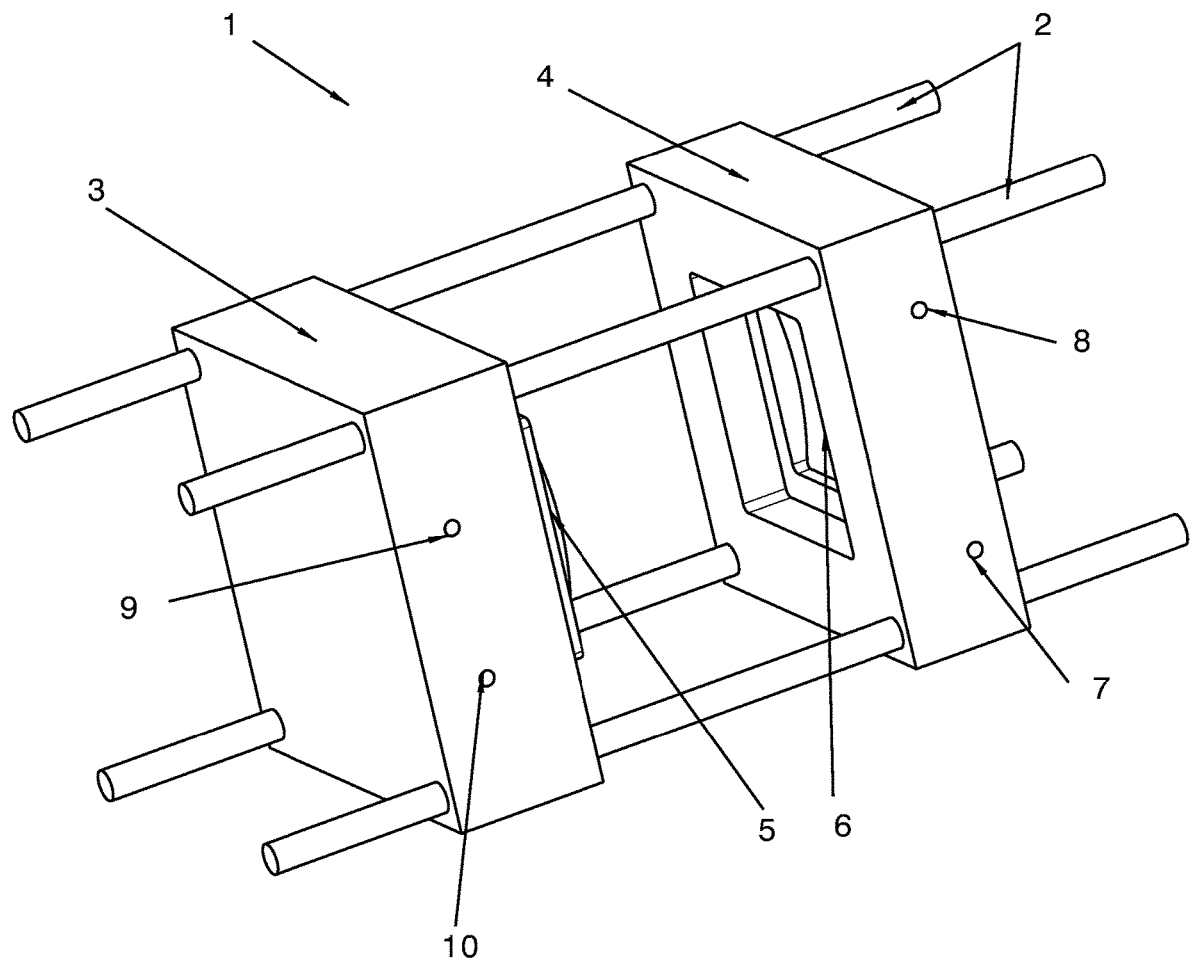
FIG. 1 is a drawing showing a mold core and cavity set in the open position, both of which have fluid channels for heating and cooling.

With reference to FIG. 1 the single cavity mold assembly, 1, is shown in the open position. Visible are the guide rods, 2, the mold core, 3, the mold cavity, 4, the mold core surface, 5, the mold cavity surface, 6, the mold cavity heating/cooling inlet, 7, the mold cavity heating/cooling outlet, 8, the mold core heating/cooling inlet, 9, the mold core heating/cooling outlet, 10.

Figure 2:
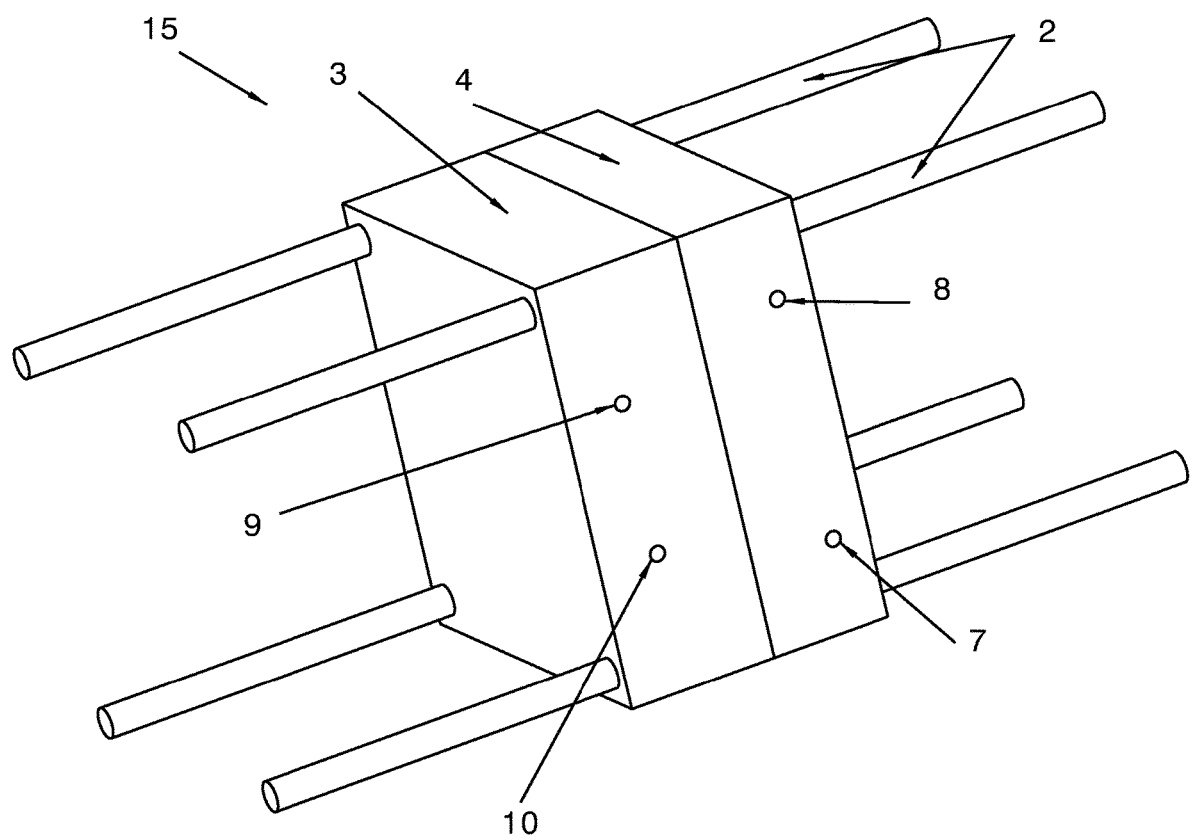
FIG. 2 is a drawing showing a mold core and cavity set of FIG. 1 in the closed position, both of which have fluid channels for heating and cooling.

With reference to FIG. 2 the single cavity mold assembly, 15, is shown in the closed position. Visible are the guide rods, 2, the mold core, 3, the mold cavity, 4, the mold core surface, 5, the mold cavity surface, 6, the mold cavity heating/cooling inlet, 7, the mold cavity heating/cooling outlet, 8, the mold core heating/cooling inlet, 9, the mold core heating/cooling outlet, 10.

Figure 3:
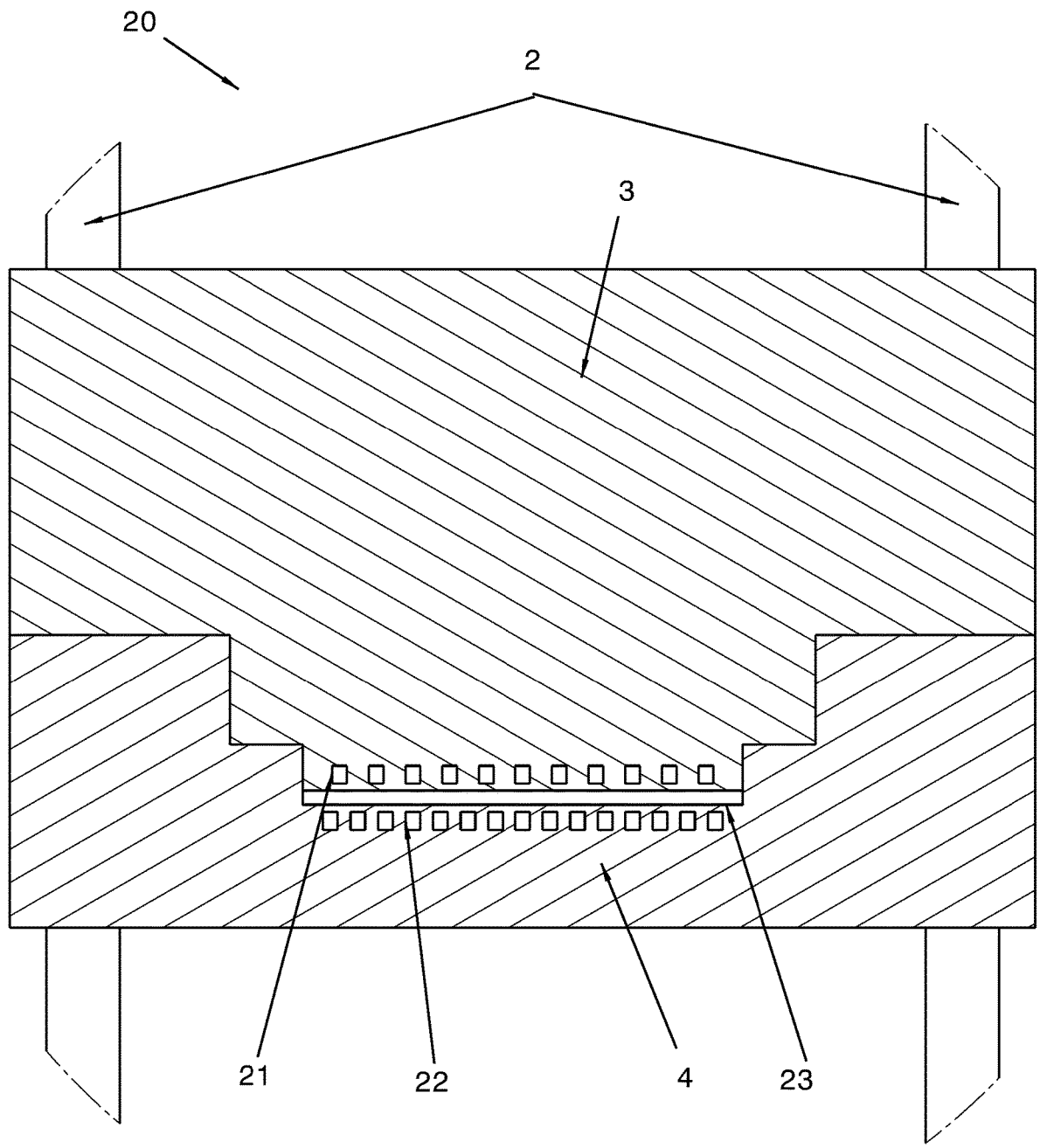
FIG. 3 is a horizontal cross section through the core and cavity of FIG. 2 showing the heating/cooling channels in the core and cavity.

With reference to FIG. 3 a horizontal cross section, 20, through the single mold assembly, 15, of FIG. 2 is shown. Visible are the guide rods, 2, the mold core, 3, the mold cavity, 4, the plastic part, 23, as well as the conformal cavity heating/cooling channels, 21, and the core conformal heating/cooling channels, 22. These conformal heating/cooling channels, 21 and 22, are very close to the surface of the core and cavity so the plastic part, 23, can be heated or cooled very quickly.

Figure 4:
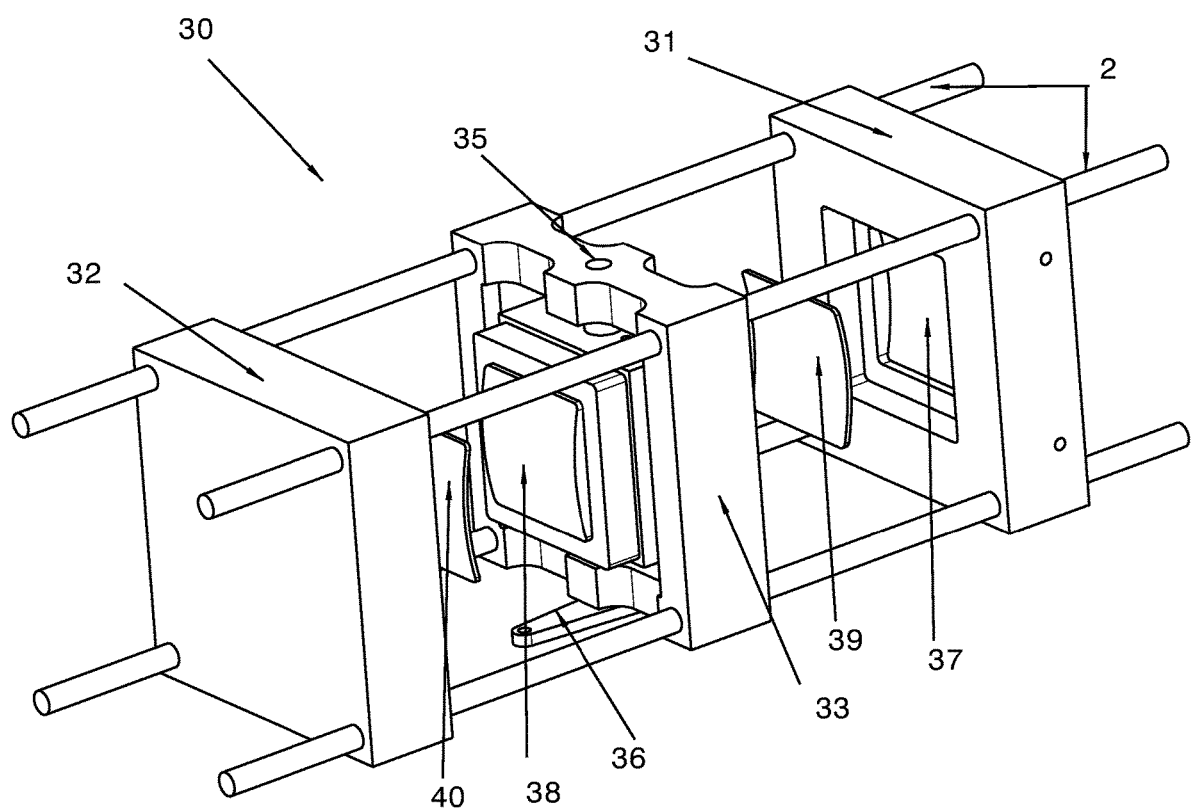
FIG. 4 is a drawing showing a stack mold with its spinning double core center, in the open position, with both parts being shown separated, from the cores and cavities.

With reference to FIG. 4 the stack mold assembly, 30, is shown in the open position. Visible are the guide rods, 2, the right mold cavity, 31, the right mold cavity surface, 37, the left mold cavity, 32, the core assembly carrier, 33, the indexing core assembly, 34, the pivot pin, 35, the indexing lever, 36, the mold core surface, 38, and the first molded part, 39, and remolded part, 40.

Figure 5:
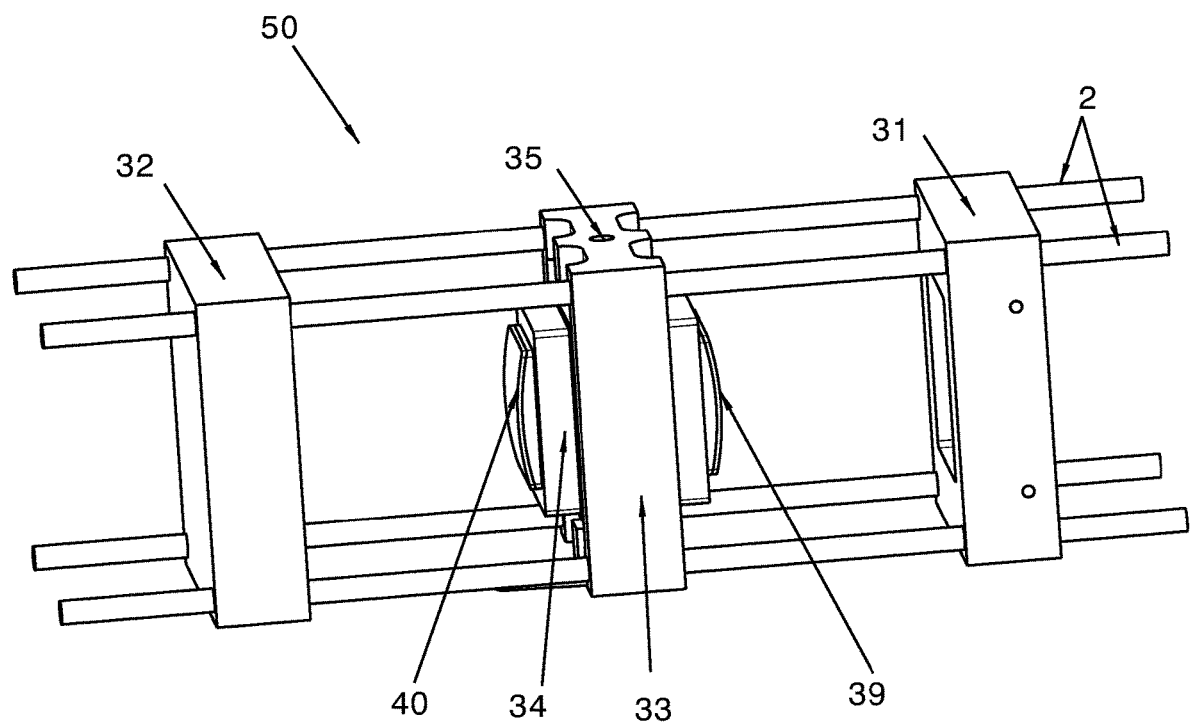
FIG. 5 is a drawing showing the stack mold of FIG. 4 with its spinning double core center, in the open position, with both parts being shown attached to the cores.

With reference to FIG. 5 the stack mold assembly, 50, is shown in the open position. Visible are the guide rods, 2, the right mold cavity, 31, the left mold cavity, 32, the core assembly carrier, 33, the indexing core assembly, 34, the pivot pin, 35, and the first molded part, 39, and remolded part, 40. In this view the parts, 39 and 40, are shown attached to the indexing core assembly, 34, at this point the remolded part, 40, will be ejected as a finished part, while the molded part, 39, will be indexed into the position currently occupied by the remolded part, 40, to begin the next molding cycle.

Figure 6:
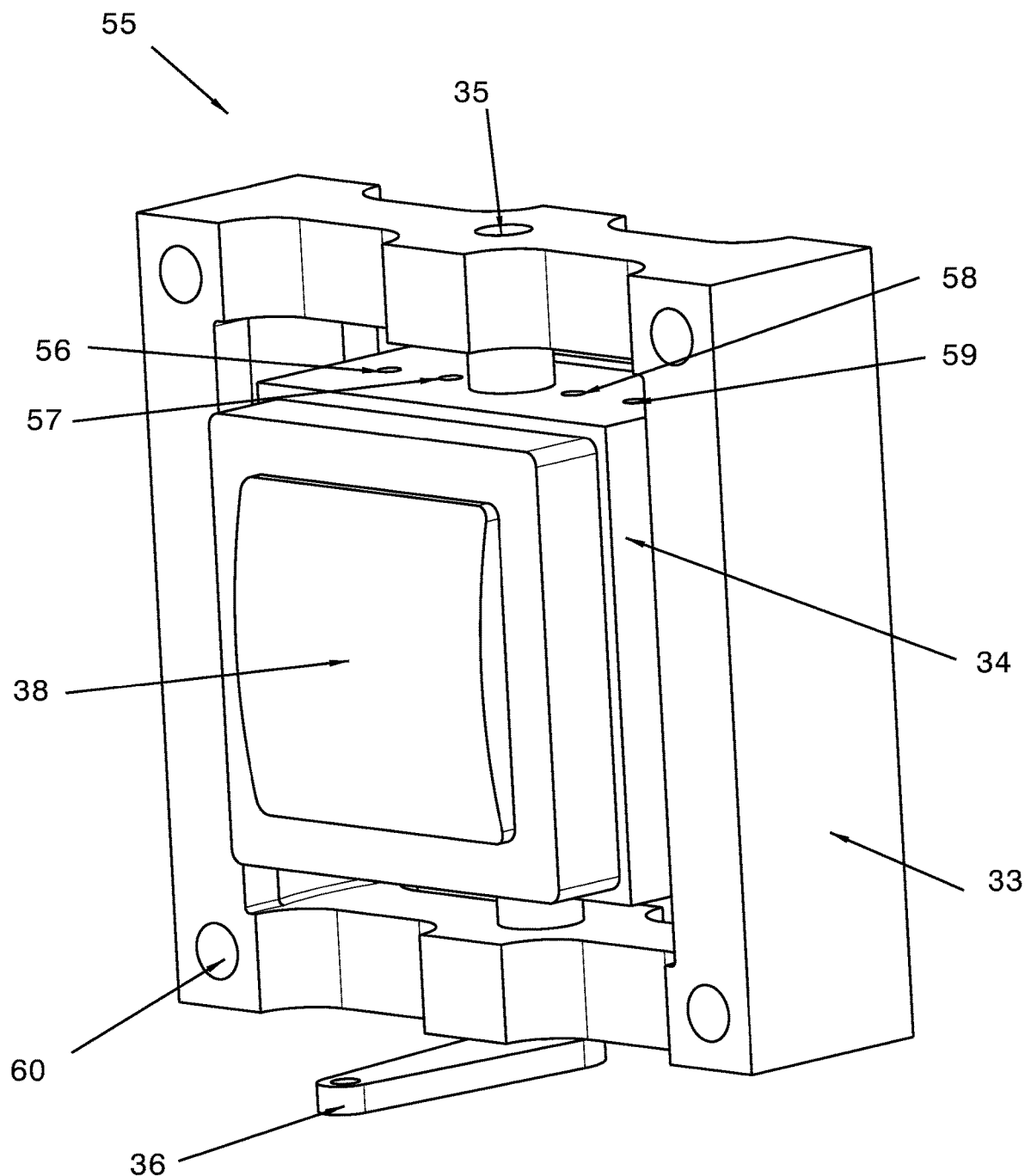
FIG. 6 is a drawing showing the spinning double core of the stack mold of FIG. 5.

With reference to FIG. 6 the indexing core and carrier assembly, 55, is shown. Visible are the guide rod holes, 60, the core assembly carrier, 33, the indexing core assembly, 34, the pivot pin, 35, the indexing lever, 36, the mold core surface, 38, the heating/cooling inlet, 56, and the heating/cooling outlet, 57, for the mold core surface, 38, the heating/cooling inlet, 58, and the heating/cooling outlet, 59, for the mold core surface on the opposite side of the indexing core assembly, 34.

Figure 7:
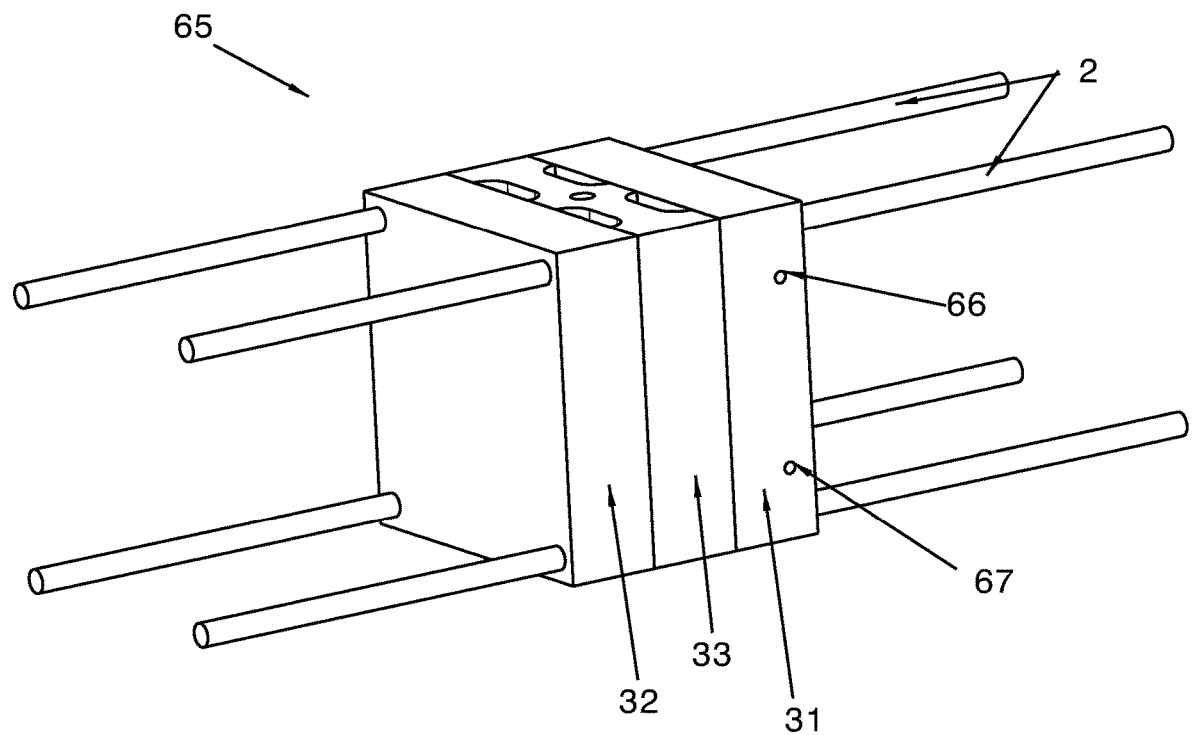
FIG. 7 is a drawing showing a stack mold with its spinning double core center, in the closed position.

With reference to FIG. 7 the stack mold assembly, 65, is shown in the closed position. Visible are the guide rods, 2, the right mold cavity, 31, the left mold cavity, 32, the core assembly carrier, 33, the heating/cooling inlet, 66, and the heating/cooling outlet, 67, for the right mold cavity, 31.

Figure 8:
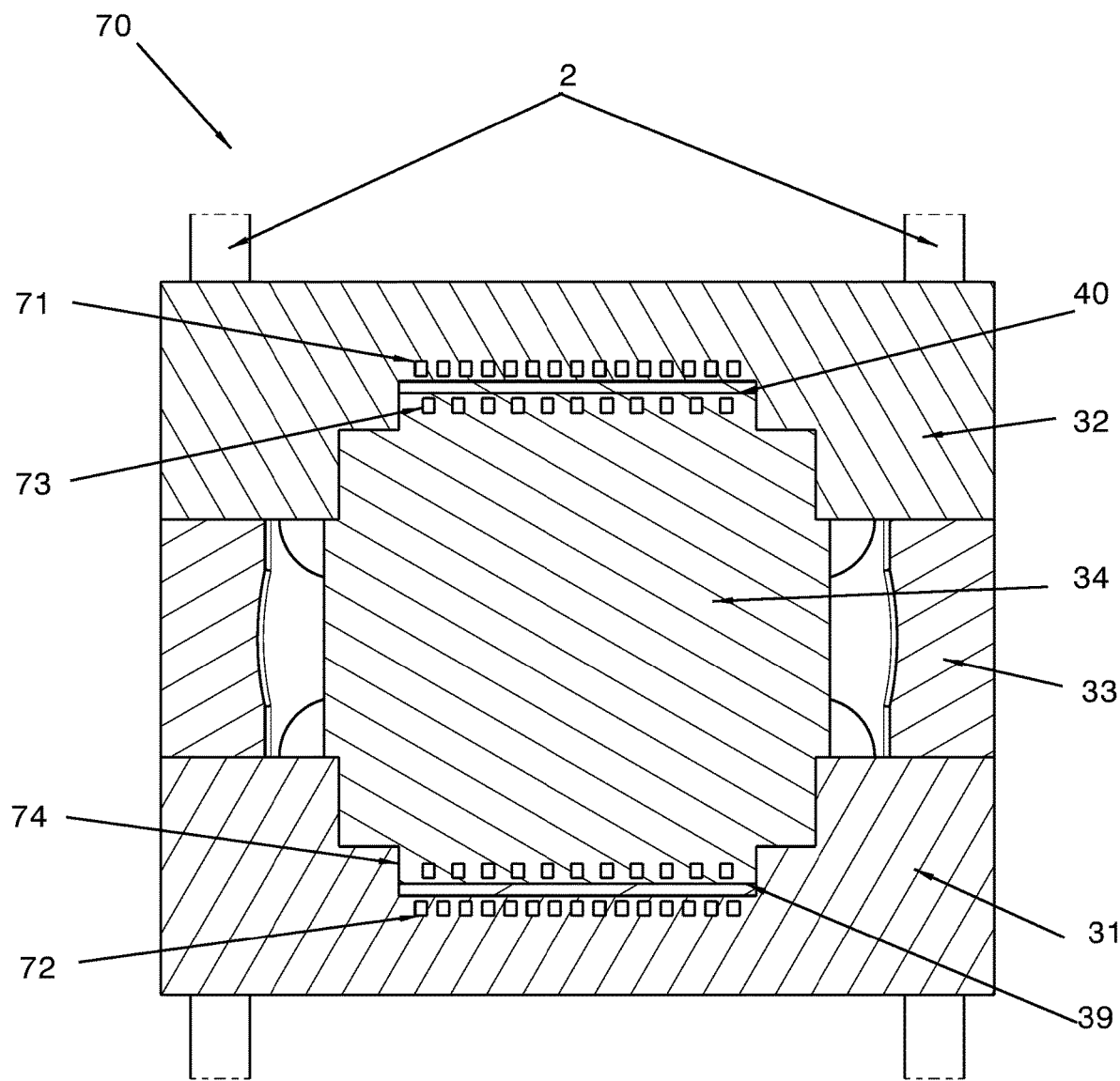
FIG. 8 is a horizontal cross section through the core and cavity of FIG. 7 showing the heating/cooling channels in the two cores and two cavities.

With reference to FIG. 8 a horizontal cross section view, 70, of the mold assembly, 65, of FIG. 7 is shown. Visible are the guide rods, 2, the right mold cavity, 31, the right mold cavity surface, 37, the left mold cavity, 32, the core assembly carrier, 33, the left mold cavity conformal heating/cooling channels, 71, the left mold core conformal heating/cooling channels, 73, the right mold cavity conformal heating/cooling channels, 72, the right mold core conformal heating/cooling channels, 74, and the first molded part, 39, and remolded part, 40. These conformal heating/cooling channels, 71, 72, 73, and 74, are very close to the surface of the cores, 34, and cavities, 31 and 32, so the plastic parts, 39 and 40, can be heated or cooled very quickly. The depth of the left mold cavity, 32, is not as deep as the right mold cavity, 31, this causes the remolded part, 40, to be under more pressure during the reheating of the part to a temperature near to $T_g$. This reduction of depth between right mold cavity, 31, and the left mold cavity, 32, is between 0% and 55%. Part geometry may be changed (or overflow reservoirs may be used) to accommodate any material volume not compensated by material compression.

Figure 9:
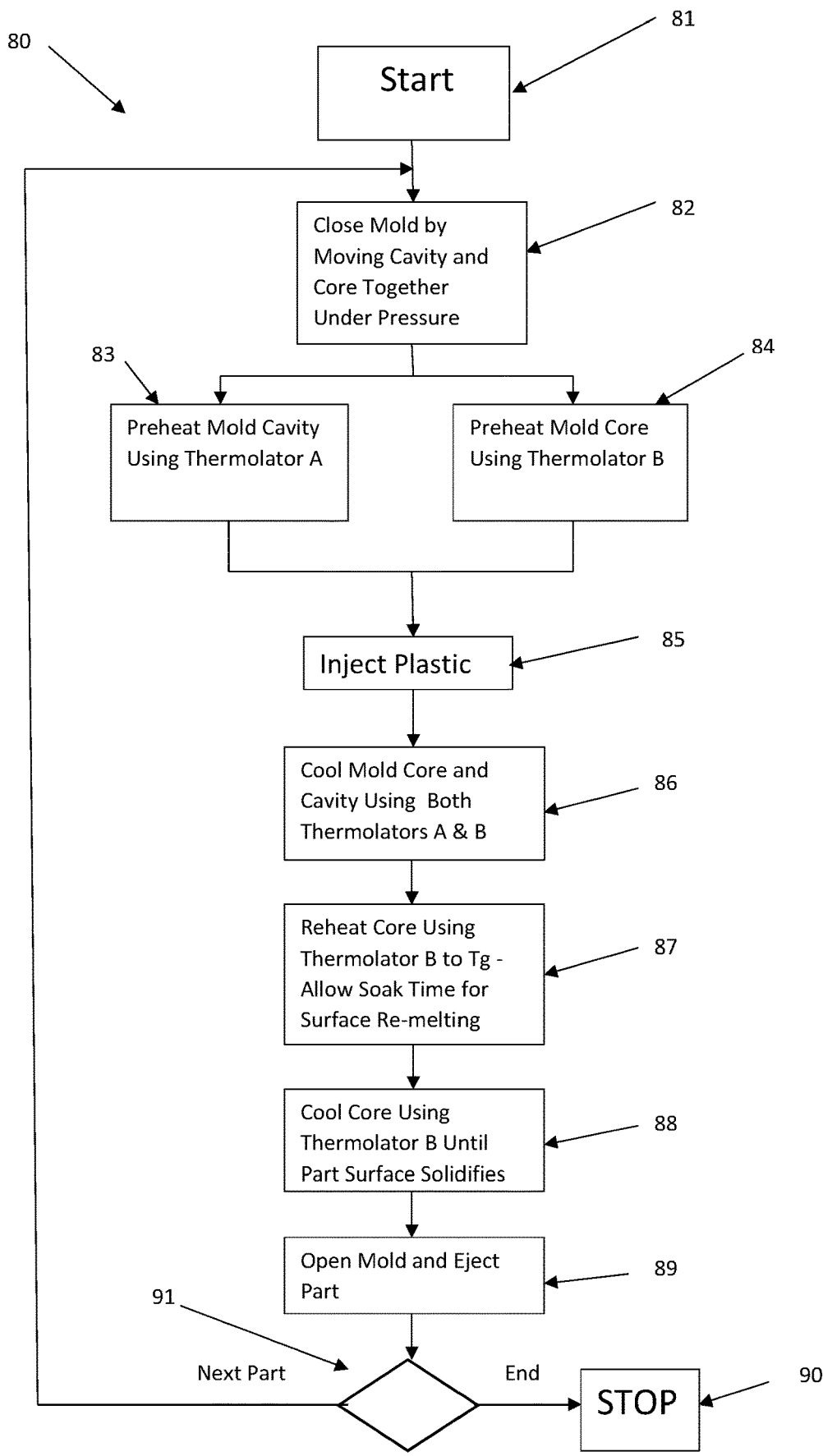
FIG. 9 shows a flow chart of the process steps involved in creating a super smooth part in a single cavity mold.

With reference to FIG. 9 a flow chart, 80, is shown that shows the operational cycle for the single cavity mold assembly, 1, of FIG. 1. The operational cycle begins with a start command, 81, followed by closing the mold, 82, then by preheating the mold cavity using thermolator A, 83, while also preheating the mold core using thermolator B, 84, this is followed by injecting plastic, 85, the mold core and cavity are then both cooled using thermolators A & B, 86, the core is reheated using thermolator B to near $T_g$ allowing soak time for surface re-melting, 87, the core is then cooled using thermolator B until the part surface solidifies, 88, the mold is then opened and the part ejected, 89, a decision is then required, 91, if this part is the last part then the process stops, 90, if not then return to closing the mold, 82.

Figure 10:
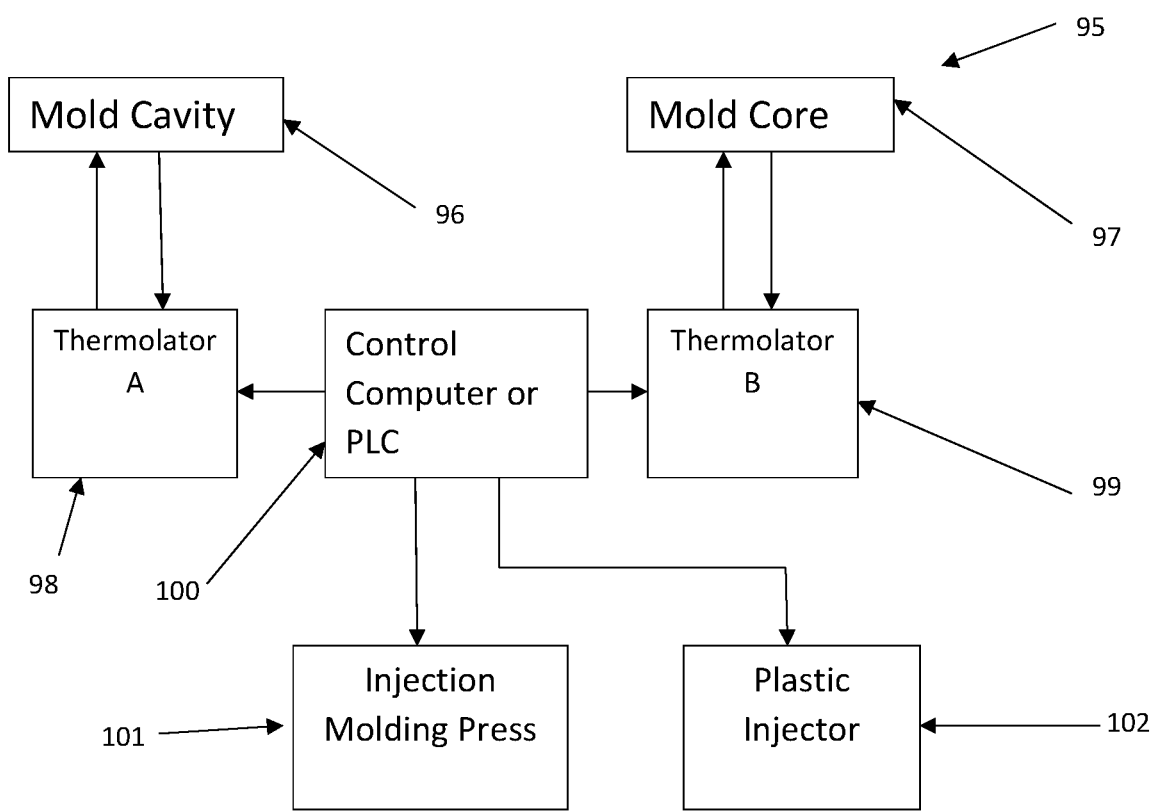
FIG. 10 shows the components involved in the control system used to create a super smooth part in a single cavity mold.

With reference to FIG. 10 the control system, 95, for the single cavity mold assembly, 1, of FIG. 1 is shown. The mold cavity, 96, and the mold core, 97, are connected to thermolator A, 98, and thermolator B, 99, respectively to allow for heating/cooling fluid to flow. The control computer or PLC (programmable logic controller), 100, controls the actions of the actions of the thermolator A, 98, the thermolator B, 99, the plastic injector, 102, and the injection molding press, 101, to carry out the actions, 80, described in FIG. 9.

Figure 11:
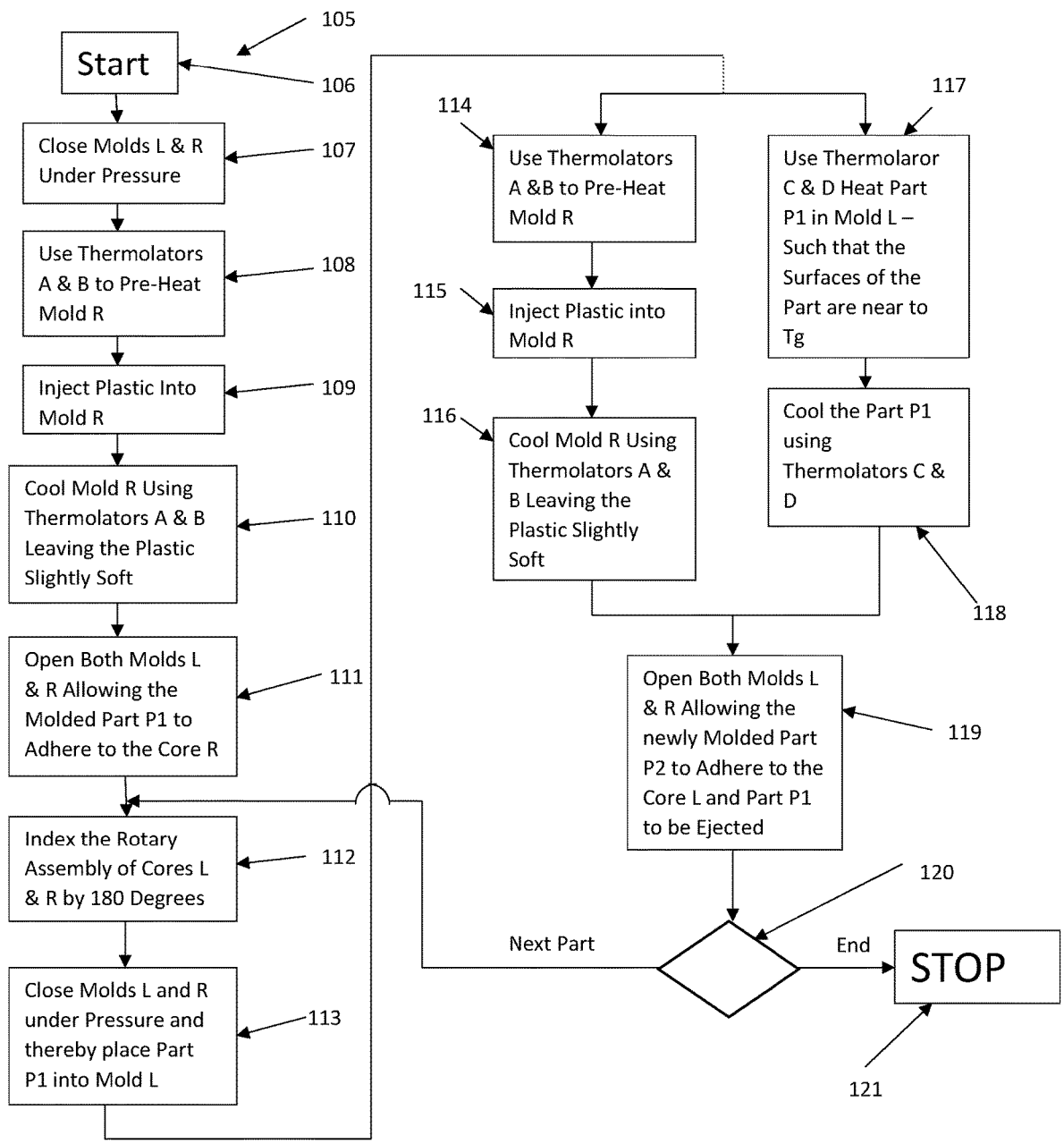
FIG. 11 shows a flow chart of the process steps involved in creating a super smooth part in a stack mold.

With reference to FIG. 11 a flow chart, 105, is shown that shows the operational cycle for the mold stack assembly, 30, of FIG. 4. The operational cycle begins with a start command, 106, followed by closing the molds L & R, 107, then by preheating the mold R using thermolators A & B, 108, this is followed by injecting plastic into mold R, 109, the mold R is then cooled using thermolators A & B, 110, leaving the plastic part slightly soft, then both molds, L & R, are opened allowing the molded part P1 to adhere to the core R, 111, the rotary core is then indexed 180°, 112, molds L & R are closed, thereby placing P1 into Mold L, 113. The process then splits into two paths, one for mold L and one for mold R as follows: for Mold R, thermolators A & B are used to preheat mold R, 114, then plastic is injected into mold R, 115, mold R is then cooled using thermolators A & B, 116, leaving the plastic part P2 slightly soft, simultaneously for Mold L thermolators C & D are used to heat part P1 in mold L, 117, such that the surfaces of the part P1 are near $T_g$, alternatively, use thermolator C and D and/or an alternative heat source to heat only the surface of part P1 in Mold L—such that the temperature of the surfaces of the part can be controlled to develop an optimized combination of heat and pressure conditions to control plastic surface smoothness having thermal processing controls to achieve the effective thermal ranges between vicate softening and $T_g$, but also able to exceed $T_g$ if required for use with lower viscosity bio-derived plastic materials, the part P1 is then cooled using thermolators C & D, 118. The process then continues by opening both molds L and R allowing the newly molded part P2 to adhere to the core L and the finished part P1 is ejected, 119, a decision is then required, 120, if this part is the last part then the process stops, 121, if not then return to Index the rotary assembly, 112.

Figure 12:
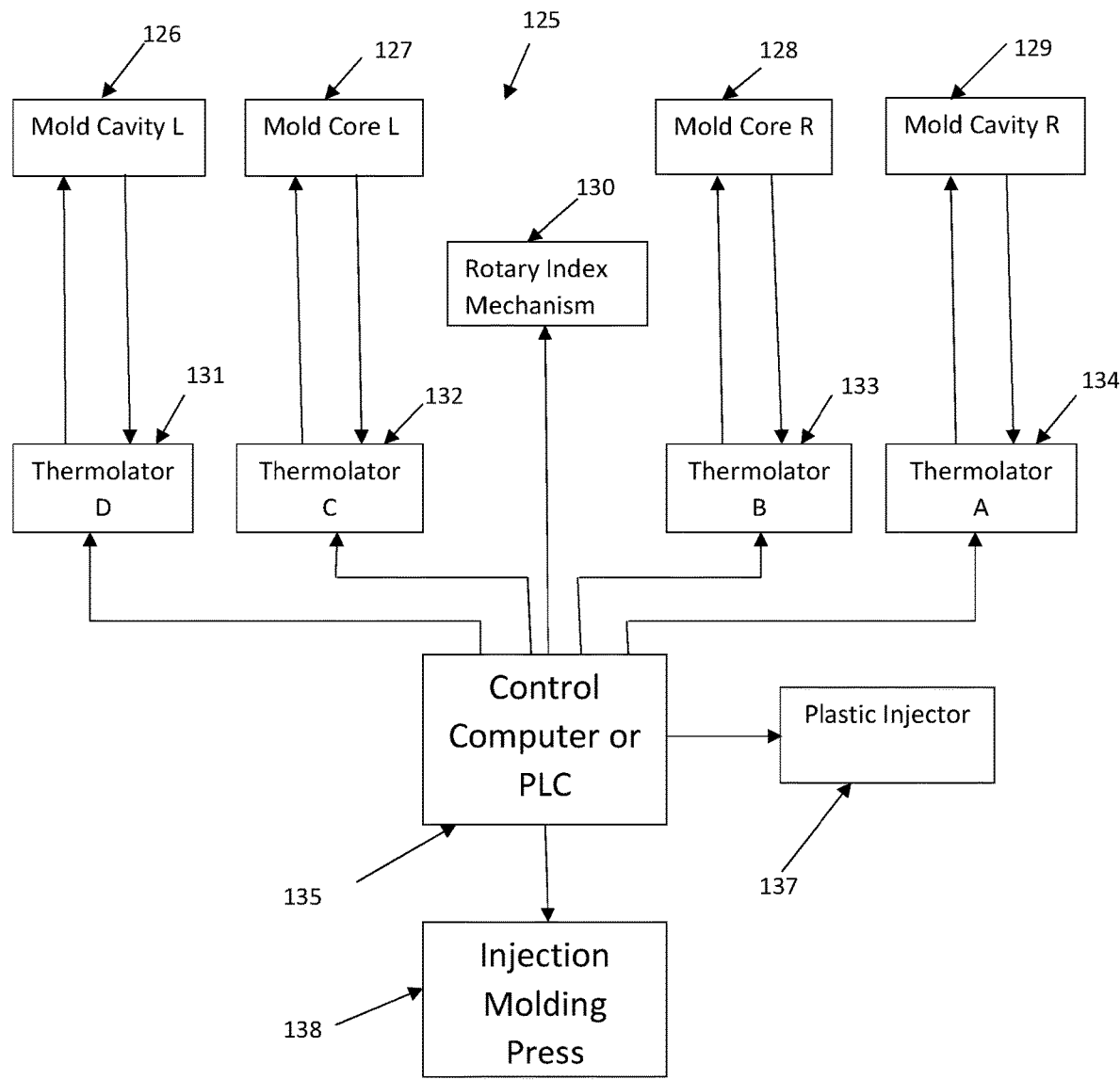
FIG. 12 shows the components involved in the control system used to create a super smooth part in a stack mold.

With reference to FIG. 12 the control system, 125, for the mold stack assembly, 30, of FIG. 4 is shown. The left (L) mold cavity, 126, and the left (L) mold core, 127, are connected to thermolator D, 131, and thermolator C, 132, respectively to allow for heating/cooling fluid to flow. The right (R) mold cavity, 129, and the right (R) mold core, 128, are connected to thermolator A, 134, and thermolator B, 133, respectively to allow for heating/cooling fluid to flow. The control computer or PLC (programmable logic controller), 135, controls the actions of the thermolator A, 134, the thermolator B, 133, the thermolator D, 131, and the thermolator C, 132, the rotary index mechanism, 130, the plastic injector, 137, and the injection molding press, 138, to carry out the actions, 105, described in FIG. 11.

Figure 13:
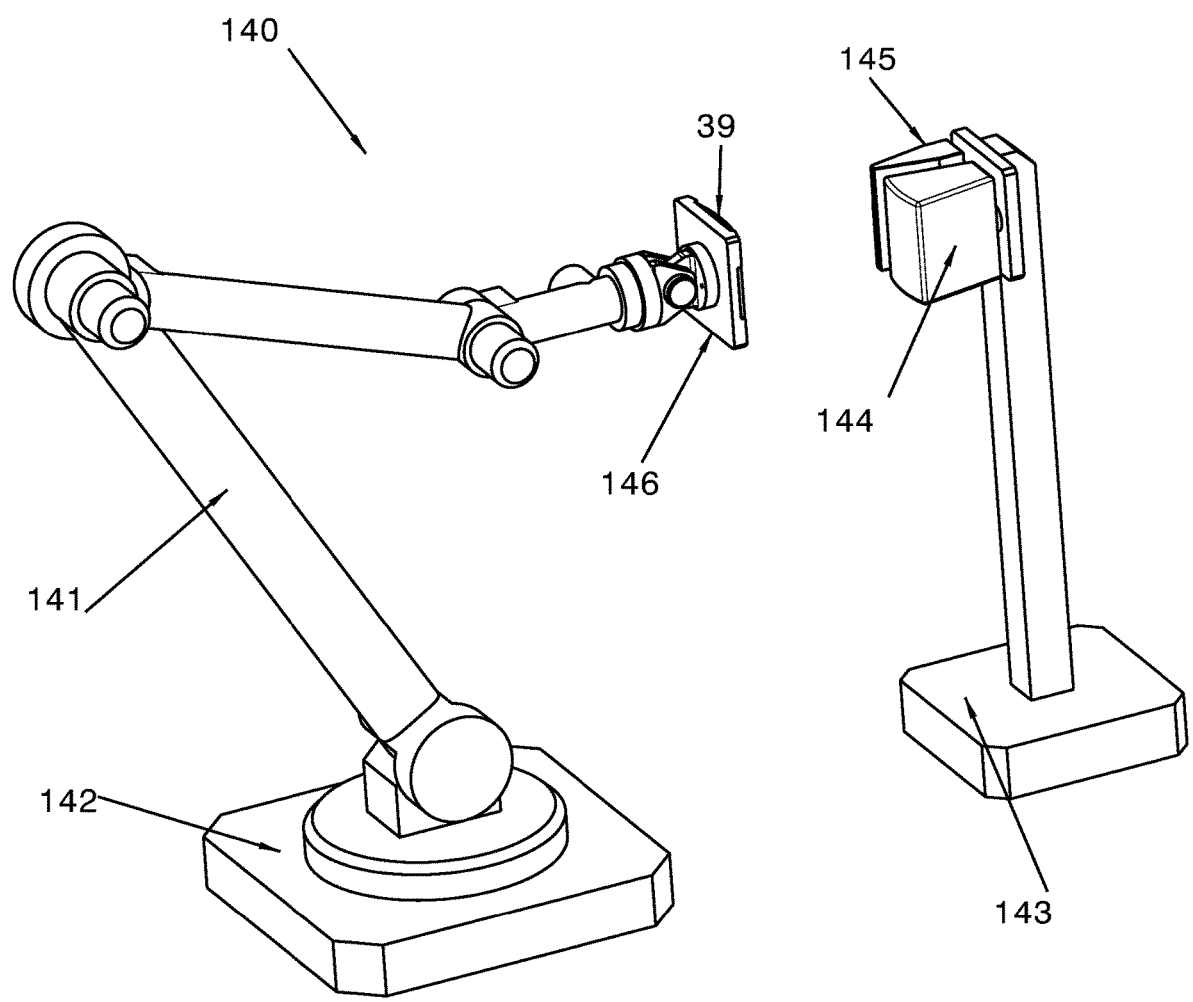
FIG. 13 shows a robot using an infrared light source and a cooling device to create a super smooth part, where the part is moved by the robot.

With reference to FIG. 13 an alternative method, 140, of creating a super smooth surface is disclosed. Visible is a robot, 141, mounted on a base plate, 142, carrying a part fixture, 146, holding a plastic part, 39, removed from a mold (not shown). Also shown is an infrared light source, 144, an air delivery device, 145, mounted on a fixed base plate and post, 143. During operation, the robot, 141, moves the plastic part, 39, past the infrared light source, 144, to take the surface of the plastic part, 39, near to $T_g$ and optionally past an air delivery device, 145, to quickly cool the surface of the plastic part, 39.

Figure 14:
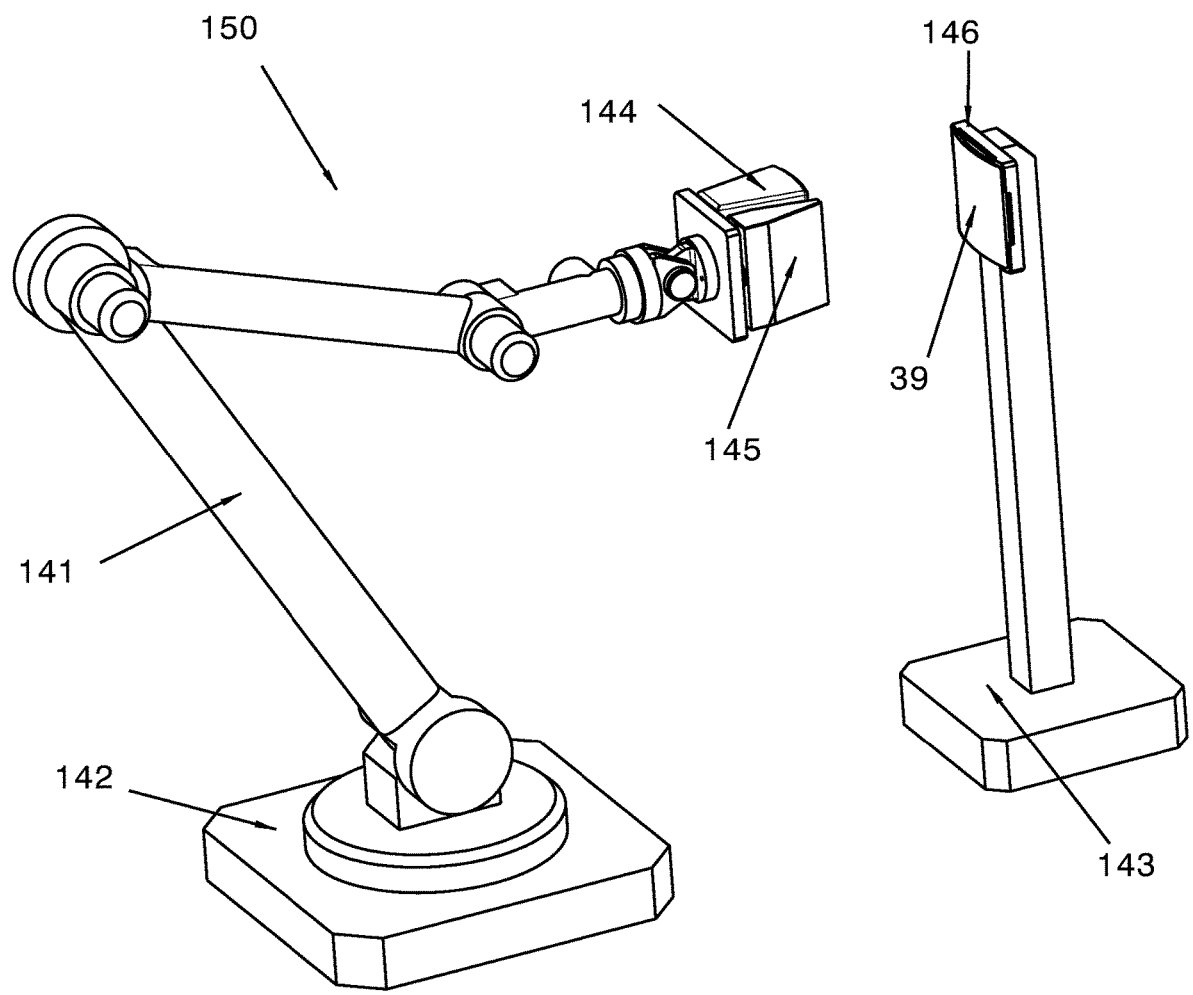
FIG. 14 shows a robot moving an infrared light source and a cooling device past a part in a fixture to create a super smooth part.

With reference to FIG. 14 a second alternative method, 150, of creating a super smooth surface is disclosed. Visible is a robot, 141, mounted on a base plate, 142, carrying an infrared light source, 144, and an air delivery device, 145. Also shown is a plastic part, 39, mounted in a part fixture, 146, mounted on a fixed base plate and post, 143. During operation, the robot, 141, moves an infrared light source, 144, and an air delivery device, 145, past a plastic part, 39, mounted in a part fixture, 146, to take the surface of the plastic part, 39, near to $T_g$ and optionally uses the air delivery device, 145, to quickly cool the surface of the plastic part, 39.

Figure 15:
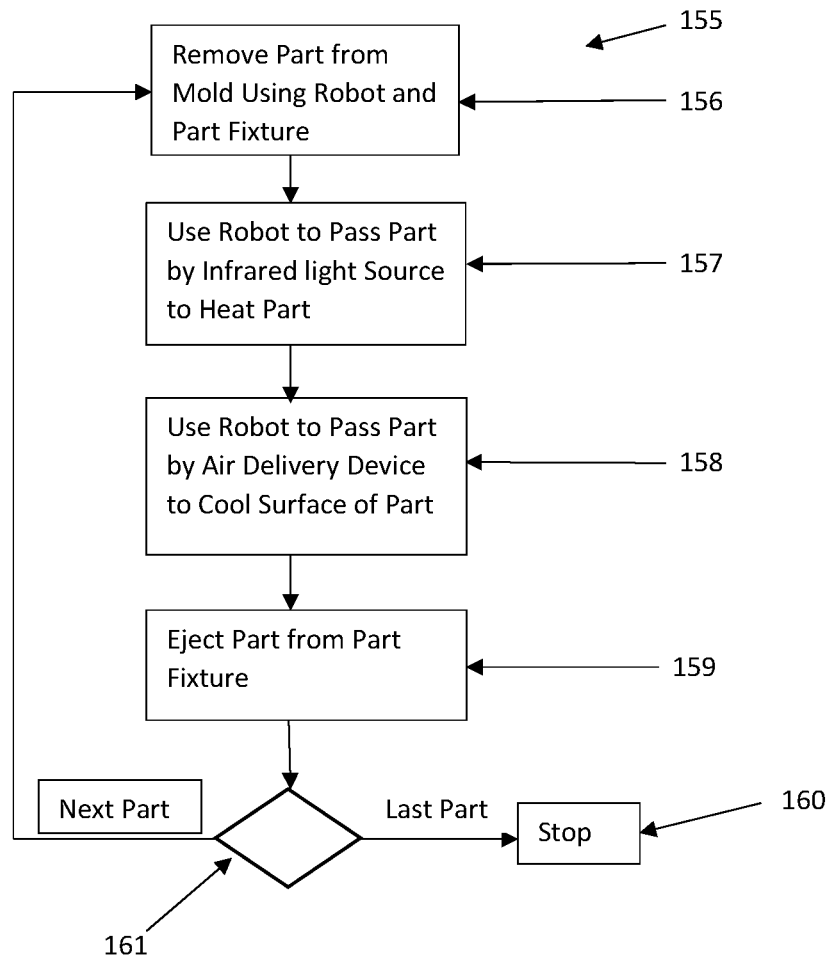
FIG. 15 shows a flow chart of the process steps involved in creating a super smooth part using a robot and an infrared light source.

With reference to FIG. 15 a flow chart, 155, is shown that shows the operational cycle for the robot system, 140, of FIG. 13. The process start by removing the part from the mold using the robot and part fixture, 156, the robot then passes the part by the infrared light source to heat the part, 157, the robot next passes the part past the air delivery device to cool the surface of the part, 158, the part is then ejected by the part fixture, 159, at this point a decision is made, 161, if this part is the last part then the system stops, 160, if it is not the last part then the system returns to remove a part, 156. Step 158, using the robot to pass the part past the air delivery device is optional.

Figure 16:
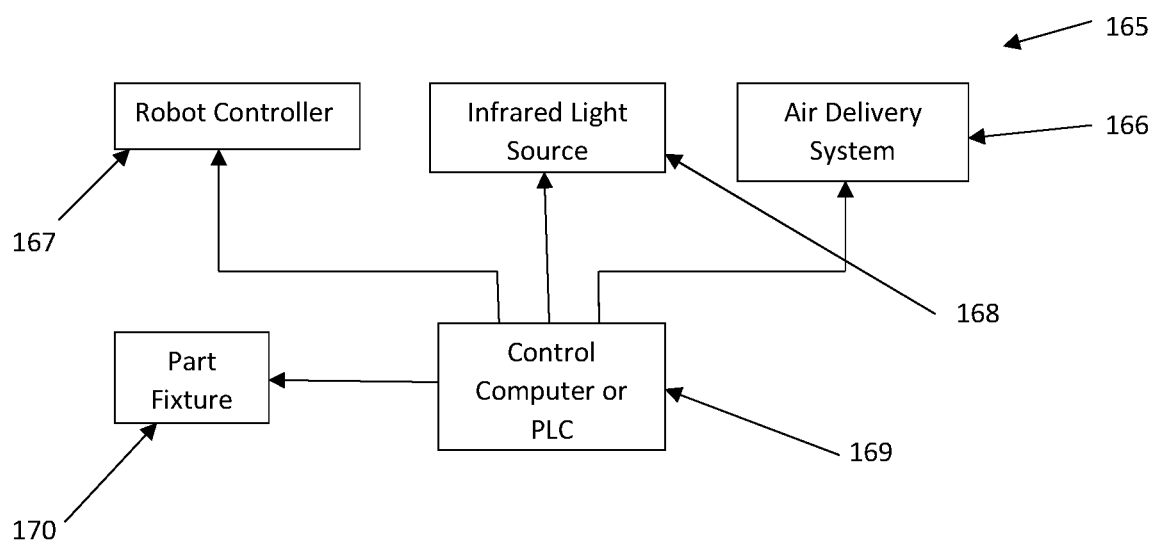
FIG. 16 shows the components involved in the control system used to create a super smooth part using a robot and an infrared light source.

With reference to FIG. 16 the control system, 165, for the robot system, 140, of FIG. 13 is shown. The control computer or PLC, 169, controls the robots movements through the robot controller, 167, turns on and off the infrared light source, 168, turns on and off the air delivery system, 166, and controls the part fixture actuation for picking and ejecting parts, 170.

This invention has been described with reference to detailed descriptions of preferred embodiments. The details of the descriptions are given for the sake of explanation only and are not intended as limitations upon the scope and spirit of the appended claims.

What is claimed is:
1. A method for creating finished injection molded parts consisting of:
    a) Using conformal heating/cooling channels to heat/cool a mold core(s) and a mold cavity or cavities;
    b) Using a heat exchanger with each of the mold core(s) and mold cavity or cavities;
    c) Preheating the mold core(s) and mold cavity or cavities;
    d) Injecting plastic into the mold cavity or cavities;
    e) Cooling the mold core(s) and mold cavity or cavities using the heat exchanger(s);
    f) Reheating the mold core(s) and/or the mold cavity or cavities near Tg of the plastic;
    g) Cooling the mold using the heat exchanger(s) to form a plastic molded part;
    h) Ejecting the plastic molded part;
    thereby creating a finished plastic part.
2. The method of claim 1 wherein operation of the heat exchangers) in steps b), e), and g) is controlled by a computer or PLC.
3. The method of claim 1 where the conformal heating/cooling channels are in proximity to the surface of their respective mold cored and/or mold cavity or cavities.
4. The method of claim 1 where the surface roughness of the finished plastic part is between 0.0254 to 6.3 microns.
5. The method of claim 1 where the surface roughness of the finished plastic part is between 0.254 to 3 microns.
6. The method of claim 1 where the plastic being injected is a thermoplastic.
7. The method of claim 1 where the finished plastic part is made from optically clear plastic.

8. The method of claim 1 where the conformal heating/cooling channels are heated before being cooled.

\* \* \* \* \*